(12) United States Patent
Miller (10) Patent No.: US 7,052,223 B1
(45) Date of Patent: May 30, 2006

(54) LOCKABLE KEY

(76) Inventor: William Clarence Miller, 2407 Oak Hill Dr., Copperas Cove, TX (US) 76522

( * ) Notice: Subject to any disclaimer, the term of this patent is extended or adjusted under 35 U.S.C. 154(b) by 0 days.

(21) Appl. No.: 10/821,536

(22) Filed: Apr. 9, 2004

Related U.S. Application Data (63) Continuation-in-part of application No. 10/021,649, filed on Dec. 19, 2001, now Pat. No. 6,796,472.

(51) Int. Cl.
*F16B 21/00* (2006.01)

(52) U.S. Cl. .................. 411/348; 411/549; 411/552; 24/453; 24/613; 24/686

(58) Field of Classification Search .............. 411/348, 411/349, 549, 552, 553; 24/453, 612, 613, 24/686, DIG. 59
See application file for complete search history.

(56) References Cited

U.S. PATENT DOCUMENTS

| | | | |
|---|---|---|---|
| 1,803,431 A * | 5/1931 | Hill ........................ | 411/349 |
| 2,779,228 A | 1/1957 | Meepos | |
| 2,816,471 A | 12/1957 | Bachman | |
| 2,968,205 A | 1/1961 | Springate | |
| 3,085,462 A | 4/1963 | Myers | |
| 3,097,559 A | 7/1963 | Chapman | |
| 3,170,362 A | 2/1965 | Mewse | |
| 3,183,586 A | 5/1965 | Sellers | |
| 3,200,690 A | 8/1965 | Dickman | |
| 3,233,496 A * | 2/1966 | Frick et al. ................ | 411/348 |
| 3,498,653 A * | 3/1970 | McCreery ............... | 403/322.2 |
| 3,608,937 A * | 9/1971 | Nave ........................ | 403/57 |
| 5,865,290 A | 2/1999 | Scott | |
| RE36,351 E * | 10/1999 | Yamamoto et al. ...... | 280/728.2 |
| 6,267,543 B1 * | 7/2001 | David et al. ............. | 411/552 |
| 6,338,649 B1 * | 1/2002 | Smith ....................... | 439/504 |

FOREIGN PATENT DOCUMENTS

JP  09290185  5/1998

* cited by examiner

*Primary Examiner*—Flemming Saether
(74) *Attorney, Agent, or Firm*—Larry Mason Lee (57) ABSTRACT

A lockable key comprises a handle, a flange, a shaft, a first spring, a second spring, and two depressible balls. The handle is connected to the top of said flange, and the shaft is connected to the bottom of the flange. The shaft provides two lateral appendages, and he first spring is coiled around the shaft between the flange and the two lateral appendages. The shaft terminates in a tapered region that provides apertures through which the depressible balls depend. The second spring is mounted internal to the shaft and acts to push the depressible balls outwardly through the apertures.

7 Claims, 9 Drawing Sheets

LOCKABLE KEY

CROSS REFERENCE TO RELATED APPLICATIONS

The present application is a continuation-in-part of U.S. patent application Ser. No. 10/021,649, filed Dec. 19, 2001, now U.S. Pat. No. 6,796,472 to William Miller, which is hereby incorporated herein by reference for all purposes.

BACKGROUND OF THE INVENTION

1. Field of the Invention

The present invention is related generally to an apparatus utilized to accomplish a lockable key. The lockable key may be utilized, for example, as a component of an automobile trunk compartmentalizer.

2. Description of the Related Art

The following prior art is known to the inventor and is believed to be relevant:

U.S. Pat. No. 6,149,040 discloses a removable vehicle trunk organizer comprising a container with a variable number of separated compartments and a reversible locking device for laterally securing the container within a vehicle trunk. The reversible locking device comprises a spiral throw-out lock with at least one extensible leg linked to an exterior actuator.

U.S. Pat. No. 5,526,972 discloses a space organizer including a backboard which extends laterally across the storage area and at least two wing-like partition members which can be either fixed or hinged and which partition a given area of the storage area into three cells or sub-areas for bags and the like.

U.S. Pat. No. 5,520,316 discloses a storage rack for automobile trunks that can be readily installed in a typical automobile trunk, and may be used to secure objects of different sizes, thereby preventing these objects from being damaged during transportation. The storage rack consists of two supporting bars, two bracing bars, and a multiple number of sliding and tightening pieces. The disclosure of this patent provides for multiple, variable sized front to back divisions of the trunk area between the rear of the trunk and the line between the wheel wells.

U.S. Pat. No. 3,200,690 discloses a retainer pin with a spring detent ball on the shaft which is similar to the configuration of the instant invention.

U.S. Pat. No. 3,183,586 discloses a spring bias retaining pin that displaces a ball detent which is similar to the configuration of the instant invention.

U.S. Pat. No. 5,865,290 teaches a locking mechanism similar to that of the configuration of the instant invention.

DESCRIPTION OF THE PREFERRED EMBODIMENT

Copending patent application U.S. patent application Ser. No. 10/021,649, filed Dec. 19, 2001 to William Miller and which is hereby incorporated herein by reference for all purposes, describes an automobile trunk compartmentalizer for, among other purposes, (i) permitting compartmentalization of automobile trunks into compartments of variable size and shape; (ii) permitting compartmentalization of automobile trunks into a variable number of compartments; and (iii) permitting compartmentalization of automobile trunks into compartments which provide the flexibility to quickly and easily change the configuration of the compartments as the loading of cargo within the trunk space of an automobile is being accomplished. In accordance with a first embodiment of the invention, the automobile trunk compartmentalizer includes a set of ten lockable keys, including flanges and handles of the lockable pins.

Figure 1:
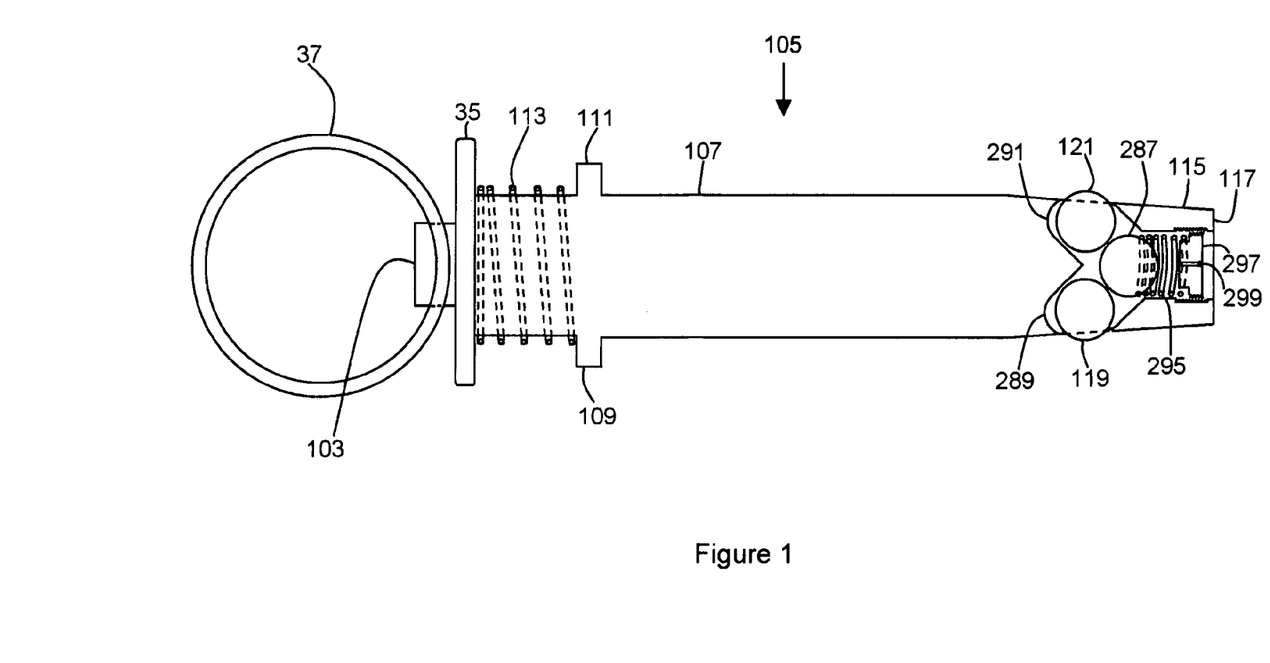
FIG. 1 is a sectional view of a manually lubricated adjustable tension lockable key, also referred to as a lockable key, in accordance with a first embodiment of the present invention.

FIG. 1 is a sectional view of a manually lubricated adjustable tension lockable key, also referred to as a lockable key, in accordance with a first embodiment of the present invention. In a lower portion, the lockable key provides a tapered portion 115, which may be seen as a part of the shaft 107. The tapered portion 115 has apertures 289 and 291 through which two opposing depressible balls 119 and 121 protrude and depend. Each of the two opposing depressible balls 119 and 121 are forced outwardly from the tapered portion 115 of the shaft 107 by springs internal to the shaft 107. When external pressure is applied, the two opposing depressible balls 119 and 121 may be forced against such springs into the body of the tapered portion 115 of the shaft 107 past the cylindrical form defining the outer diameter of the shaft 107. When no external pressure is applied, the two opposing depressible balls 119 and 121 depend outwardly.

A wedge member, when activated, pushes the depressible balls outwardly through said apertures. The wedge member is a third depressible ball. A second spring that is mounted internal to the shaft acts to push the depressible balls outwardly through the apertures.

The lockable key 105 also includes an upper portion of the lockable key 105 that is seen to provide a shaft 107, connected to the bottom of the flange 35, and opposing left and right hand lateral appendages 109 and 111, respectively. The lockable key is thus suitable for insertion into a keyed aperture, for example a keyed aperture that has its interior shaft defined by a cylindrical form just slightly greater in diameter than the cylindrical form defining the outer diameter of the shaft 107 and less in diameter than a cylindrical form through which the two opposing depressible balls 119 and 121 could pass without being depressed into the body of the tapered portion 115 of the shaft 107.

Such a keyed aperture may be found, for example, in a slideable shaft. Because the lockable key has the opposing left and right hand lateral appendages 109 and 111, respectively, the keyed aperture may be constructed having a key way such that the lockable key 105 can only be slid into the keyed aperture when the opposing left and right hand lateral appendages 109 and 111, respectively, are aligned with the key way.

If the shaft 107 is regarded as having a cylindrical axis, a keyed aperture may be provided with a key way such that the lockable key 105 may be slid into the keyed aperture when the lockable key 105 is in a first orientation with respect to the cylindrical axis, and such that the lockable key 105 may not be slid into the keyed aperture when the lockable key 105 has been rotated about, or is otherwise not in the first position with respect to, the cylindrical axis. The lateral appendages 109 and 111 of the lockable key 105 may therefore be aligned to coincide with the key way provided by the keyed aperture when the lockable key 105 is to be inserted into the keyed aperture. When the lockable key 105 has been inserted into such a keyed aperture, the two opposing depressible balls 119 and 121 provide resistance to retraction from the keyed aperture.

Once the lockable key 105 is fully inserted, a twisting motion will force the movement of the lateral appendages 109 and 111 into a locking area within the shaft of a keyed aperture in a slideable shaft. The locking area permits lateral movement of the lateral appendages 109 and 111, and thus of the lockable key 105, but not vertical movement, thereby acting as a lock retaining the lockable key 105 within the slideable shaft.

The lockable key also includes a first spring, identified as a coiled spring 113, that is coiled around the shaft between the lateral appendages 109 and 111 and the flange 35. The flange 35 separates the shaft 107 of the lockable key 105 from the head region of the lockable key 105, and further serves to restrain the coiled spring 113. As it compresses, the coiled spring 113 provides resistance to insertion of the lockable key 105 into the keyed aperture of a slideable shaft.

The lockable key also includes a head region having a Swivelable connector 103 that connects a handle 37 to an upper surface of a flange 35. The ring shaped handle 37 permits easy insertion of a finger to retract the lockable key 105 from a keyed aperture into which it may have been inserted, and the Swivelable connector 103 permits the handle 37 to lie flat against the flange 35 when not in use. The lockable key 105 may be grasped by the handle 37, aligned with the key way of a keyed aperture, and pushed longitudinally down into the keyed aperture, causing a depression of the two opposing depressible balls 119 and 121 to fit within the circumference of the keyed aperture.

As the lockable key 105 is pushed deeper into the keyed aperture, a widened region within the keyed aperture may allow the lockable key 105 to be rotated about the cylindrical axis of the shaft 107 (by turning the handle 37 about the cylindrical axis of the shaft 107) such that the lateral appendages 109 and 111 lock or set within the keyed aperture of the slideable shaft under an upper sheet of an upper surface through which the keyed aperture is provided. Regardless of whether the lockable key is turned, however, resistance caused by the depression of the depressible balls advantageously hinders removal of the lockable key from the keyed aperture. Retraction of a lockable pin is accomplished by turning the lockable pin to place the lockable pin's lateral appendages into the key way of the shaft within which the lockable pin is seated, then pulling the lockable pin's handle up, overcoming the resistance provided by the lockable pin's depressible balls.

Figure 2:
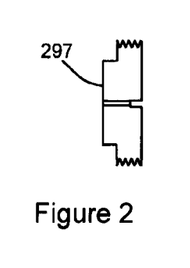
FIG. 2 is a side view of a manually lubricated adjustable tension insert.
Figure 3:
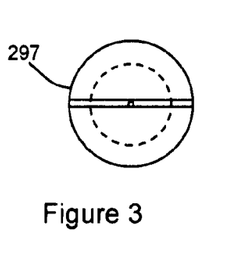
FIG. 3 is a top view of a manually lubricated adjustable tension insert.

At a lower portion, the tapered region has a manually lubricated adjustable tension insert 297 that is removable for an application of a lubricant. FIG. 2 is a side view of a manually lubricated adjustable tension insert 297, in accordance with first embodiment of the present invention, and FIG. 3 is a top view of a manually lubricated adjustable tension insert 297, in accordance with the first embodiment of the present invention. The manually lubricated adjustable tension insert 297 is a short cylinder having (a) a slotted circular base operative to allow a screwdriver to be used to adjust the manually lubricated adjustable tension insert 297 and (b) a threaded lateral surface allowing the manually lubricated adjustable tension insert 297 to be unscrewed from the tapered region when lubricant is to be applied. The manually lubricated adjustable tension insert 297 also has a small hole 299 to allow air to penetrate into the shaft and for the application of a lubricant.

Figure 4:
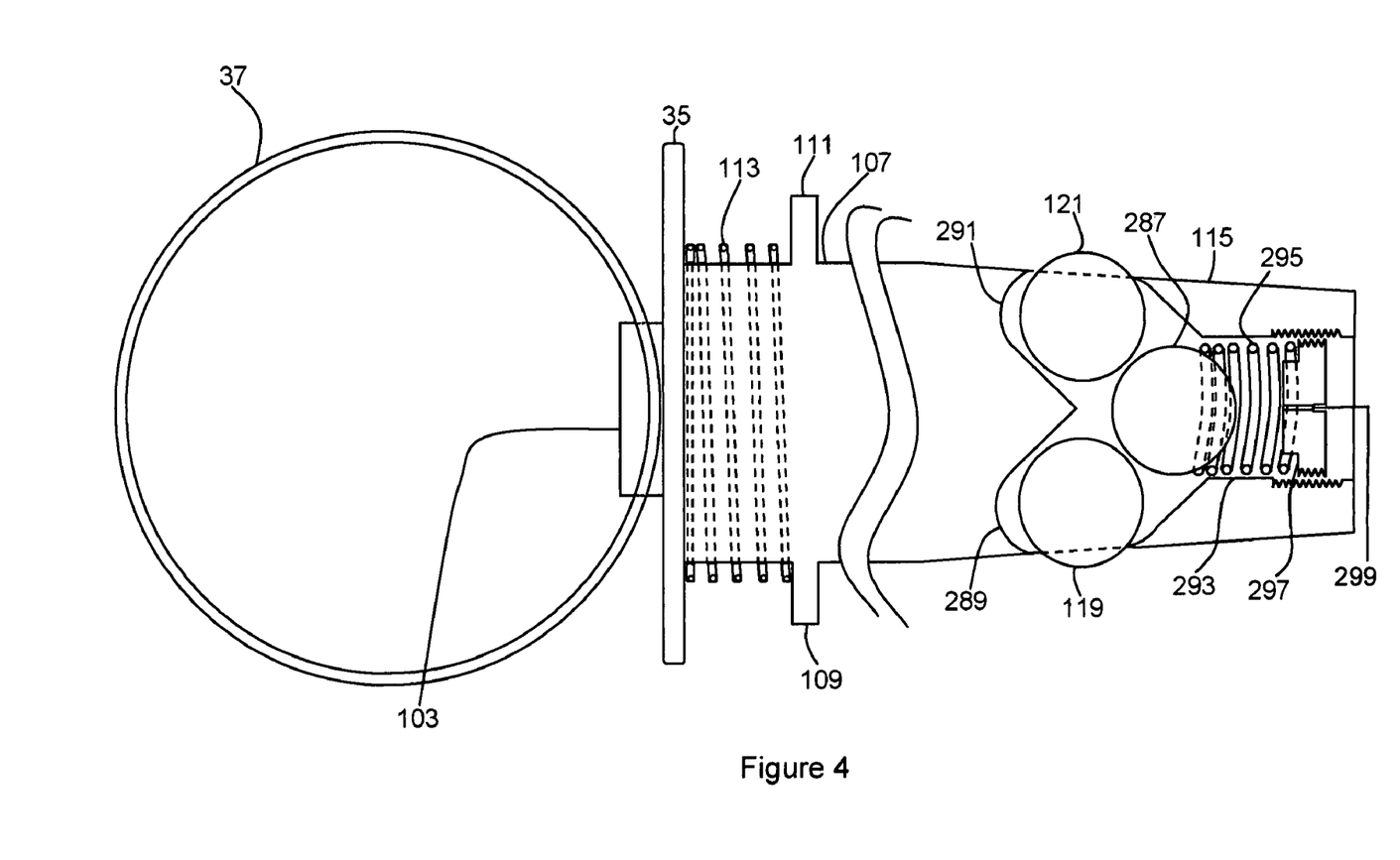
FIG. 4 is an expanded section view of a manually lubricated adjustable tension lockable pin, also referred to as a lockable key.

FIG. 4 is an expanded section view of the manually lubricated adjustable tension lockable pin, also referred to as the lockable key, in accordance with the first embodiment of the present invention. In the lower portion, the tapered portion 115 has apertures 289 and 291 through which the two opposing depressible balls 119 and 121 protrude and depend, as indicated above with respect to FIG. 1. The two opposing depressible balls 119 and 121 are forced outwardly from the tapered portion 115 of the shaft 107 by at least one spring internal to the shaft 107.

When external pressure is applied, the two opposing depressible balls 119 and 121 may be forced against the wedge member, the wedge member being a third depressible ball, against the spring 295 into the body of the tapered portion 115 of the shaft 107 past the cylindrical form defining the outer diameter of the shaft 107. The spring 295 is a second spring that is mounted internal to the shaft and acts to push the depressible balls outwardly through the apertures. When no external pressure is applied, the two opposing depressible balls 119 and 121 are free to depend outwardly.

The lockable key 105 of FIG. 4, like the lockable key 105 of FIG. 1, also includes an upper portion that is seen to provide a shaft 107, connected to the bottom of the flange 35, and opposing left and right hand lateral appendages 109 and 111, respectively. Once the lockable key 105 is fully inserted into a keyed aperture having both a key way and a locking area, a twisting motion will force the movement of the lateral appendages 109 and 111 into the locking area within the keyed aperture. The locking area permits lateral movement of the lateral appendages 109 and 111, and thus of the lockable key 105, but not vertical movement, thereby acting as a lock retaining the lockable key 105 within the slideable shaft.

The lockable key also includes a first spring, identified as a coiled spring 113, that is coiled around the shaft between the lateral appendages 109 and 111 and the flange 35. The expanded sectional view of the manually lubricated adjustable tension lockable pin of FIG. 4 provides a more detailed view of these features than the sectional view of the manually lubricated adjustable tension lockable pin of FIG. 1, but in both, the flange 35 separates the shaft 107 of the lockable key 105 from the head region of the lockable key 105, and further serves to restrain the coiled spring 113. As it compresses, the coiled spring 113 provides resistance to insertion of the lockable key 105 into the keyed aperture of a slideable shaft.

Like the lockable key of FIG. 1, the lockable key of FIG. 4 also includes a head region having a Swivelable connector 103 that connects a handle 37 to an upper surface of a flange 35. The ring shaped handle 37 permits easy insertion of a finger to retract the lockable key 105 from a keyed aperture into which it may have been inserted, and the Swivelable connector 103 permits the handle 37 to lie flat against the flange 35 when not in use. The lockable key 105 may be grasped by the handle 37, aligned with the key way of a keyed aperture, and pushed longitudinally down into the keyed aperture, causing a depression of the two opposing depressible balls 119 and 121 to fit within the circumference of the keyed aperture.

FIG. 4 also provides a more detailed view of a relationship between the tapered region 115 (shown generally in FIG. 1) and the manually lubricated adjustable tension insert 297 (shown generally in FIGS. 2 and 3). As indicated with respect to FIGS. 1–3 and with respect to FIG. 4, the manually lubricated adjustable tension insert 297 is a short cylinder having (a) a slotted circular base operative to allow a screwdriver to be used to adjust the manually lubricated adjustable tension insert 297 and (b) a threaded lateral surface allowing the manually lubricated adjustable tension insert 297 to be unscrewed from the tapered region when lubricant is to be applied. The manually lubricated adjustable tension insert 297 also has a small hole 299 to allow air to penetrate into the shaft and for the application of a lubricant.

Figure 5:
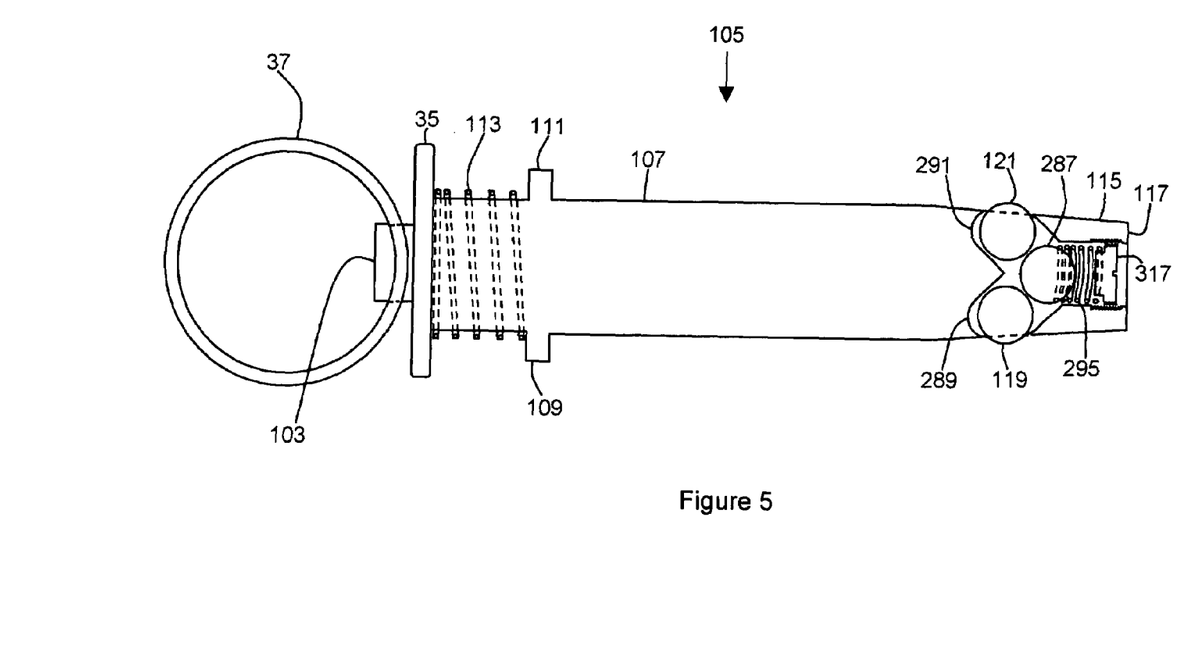
FIG. 5 is a sectional view of a permanently lubricated adjustable tension lockable key, also referred to as a lockable key.
Figure 6:
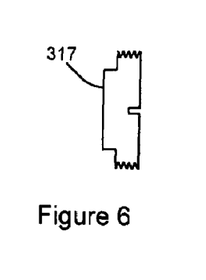
FIG. 6 is a side view of a permanently lubricated adjustable tension insert, also referred to as a lockable key.

FIG. 5 is a sectional view of a permanently lubricated adjustable tension lockable key, also referred to as a lockable key, in accordance with a second embodiment of the present invention. FIG. 6 is a side view of a permanently lubricated adjustable tension insert 317, in accordance with second embodiment of the present invention, and FIG. 7 is a top view of a permanently lubricated adjustable tension insert 317, in accordance with the second embodiment of the present invention.

Figure 7:
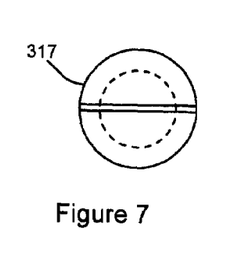
FIG. 7 is a top view of a permanently lubricated adjustable tension insert, also referred to as a lockable key.

One of the most salient differences between the lockable key of FIG. 1 and the lockable key of FIG. 5, and between the manually lubricated adjustable tension insert 297 of FIGS. 2 and 3 and the permanently lubricated adjustable tension insert 317 of FIGS. 6 and 7, is the lack of a hole passing through the permanently lubricated adjustable tension insert 317. Since the permanently lubricated adjustable tension lockable key is permanently lubricated, there is no need for a hole through which additional lubricant may be introduced. Like the manually lubricated adjustable tension insert 297 of FIGS. 2 and 3, the permanently lubricated adjustable tension insert 317 of FIGS. 6 and 7 is removable, as indicated by threading evident around a lateral surface of both.

Other than the lack of a hole through the permanently lubricated adjustable insert, the lockable key 105 of FIG. 5 has a lower portion like the lower portion of the lockable key 105 of FIG. 1. The lockable key provides a tapered portion 115, which may be seen as a part of the shaft 107. The tapered portion 115 has apertures 289 and 291 through which two opposing depressible balls 119 and 121 protrude and depend. Each of the depressible balls 119 and 121 are forced outwardly from the tapered portion 115 of the shaft 107 by springs internal to the shaft 107. When external pressure is applied, the depressible balls 119 and 121 may be forced against such springs into the body of the tapered portion 115 of the shaft 107 past the cylindrical form defining the outer diameter of the shaft 107. When no external pressure is applied, the depressible balls 119 and 121 depend outwardly.

A wedge member, when activated, pushes the depressible balls outwardly through said apertures. The wedge member is a third depressible ball. A second spring that is mounted internal to the shaft acts to push the depressible balls outwardly through the apertures.

The lockable key 105 of FIG. 5 also has an upper portion like the upper portion of the lockable key 105 of FIG. 1. The lockable key 105 of FIG. 5 also includes an upper portion of the lockable key 105 that is seen to provide a shaft 107, connected to the bottom of the flange 35, and opposing left and right hand lateral appendages 109 and 111, respectively. The lockable key is thus suitable for insertion into a keyed aperture, for example a keyed aperture that has its interior shaft defined by a cylindrical form just slightly greater in diameter than the cylindrical form defining the outer diameter of the shaft 107 and less in diameter than a cylindrical form through which the depressible balls 119 and 121 could pass without being depressed into the body of the tapered portion 115 of the shaft 107.

As indicated above with respect to the lockable key 105 of FIG. 1, such a keyed aperture may be found, for example, in a slideable shaft. Because the lockable key has the opposing left and right hand lateral appendages 109 and 111, respectively, the keyed aperture may be constructed having a key way such that the lockable key 105 can only be slid into the keyed aperture when the opposing left and right hand lateral appendages 109 and 111, respectively, are aligned with the key way.

If the shaft 107 is regarded as having a cylindrical axis, a keyed aperture may be provided with a key way such that the lockable key 105 may be slid into the keyed aperture when when the lockable key 105 is in the first orientation with respect to the cylindrical axis, and such that the lockable key 105 may not be slid into the keyed aperture when the lockable key 105 has been rotated about, or is otherwise not in the first position with respect to, the cylindrical axis. The lateral appendages 109 and 111 of the lockable key 105 may therefore be aligned to coincide with the key way provided by the keyed aperture when the lockable key 105 is to be inserted into the keyed aperture. When the lockable key 105 has been inserted into such a keyed aperture, the depressible balls 119 and 121 provide resistance to retraction from the keyed aperture.

Once the lockable key 105 is fully inserted, a twisting motion will force the movement of the lateral appendages 109 and 111 into a locking area within the shaft of a keyed aperture in a slideable shaft. The locking area permits lateral movement of the lateral appendages 109 and 111, and thus of the lockable in 105, but not vertical movement, thereby acting as a lock retaining the lockable key 105 within the slideable shaft.

The lockable key also includes a first spring, identified as a coiled spring 113, that is coiled around the shaft between the lateral appendages 109 and 111 and the flange 35. The flange 35 separates the shaft 107 of the lockable key 105 from the head region of the lockable key 105, and further serves to restrain the coiled spring 113. As it compresses, the coiled spring 113 provides resistance to insertion of the lockable key 105 into the keyed aperture of a slideable shaft.

The lockable key also includes a head region having a Swivelable connector 103 that connects a handle 37 to an upper surface of a flange 35. The ring shaped handle 37 permits easy insertion of a finger to retract the lockable key 105 from a keyed aperture into which it may have been inserted, and the Swivelable connector 103 permits the handle 37 to lie flat against the flange 35 when not in use. The lockable key 105 may be grasped by the handle 37, aligned with the key way of a keyed aperture, and pushed longitudinally down into the keyed aperture, causing a depression of the depressible balls 119 and 121 to fit within the circumference of the keyed aperture.

As the lockable key 105 is pushed deeper into the keyed aperture, a widened region within the keyed aperture may allow the lockable key 105 to be rotated about the cylindrical axis of the shaft 107 (by turning the handle 37 about the cylindrical axis of the shaft 107) such that the lateral appendages 109 and 111 lock or set within the keyed aperture of the slideable shaft under an upper sheet of an upper surface through which the keyed aperture is provided. Regardless of whether the lockable key is turned, however, resistance caused by the depression of the depressible balls advantageously hinders removal of the lockable key from the keyed aperture. Retraction of a lockable pin is accomplished by turning the lockable pin to place the lockable pin's lateral appendages into the key way of the shaft within which the lockable pin is seated, then pulling the lockable pin's handle up, overcoming the resistance provided by the lockable pin's depressible balls.

The permanently lubricated adjustable tension insert 317 is a short cylinder having (a) a slotted circular base operative to allow a screwdriver to be used to adjust the permanently lubricated adjustable tension insert 317 and (b) a threaded lateral surface allowing the permanently lubricated adjustable tension insert 317 to be unscrewed from the tapered region when lubricant is to be applied. The permanently lubricated adjustable tension insert 317 also has a small hole to allow air to penetrate into the shaft and for the application of a lubricant.

Figure 8:
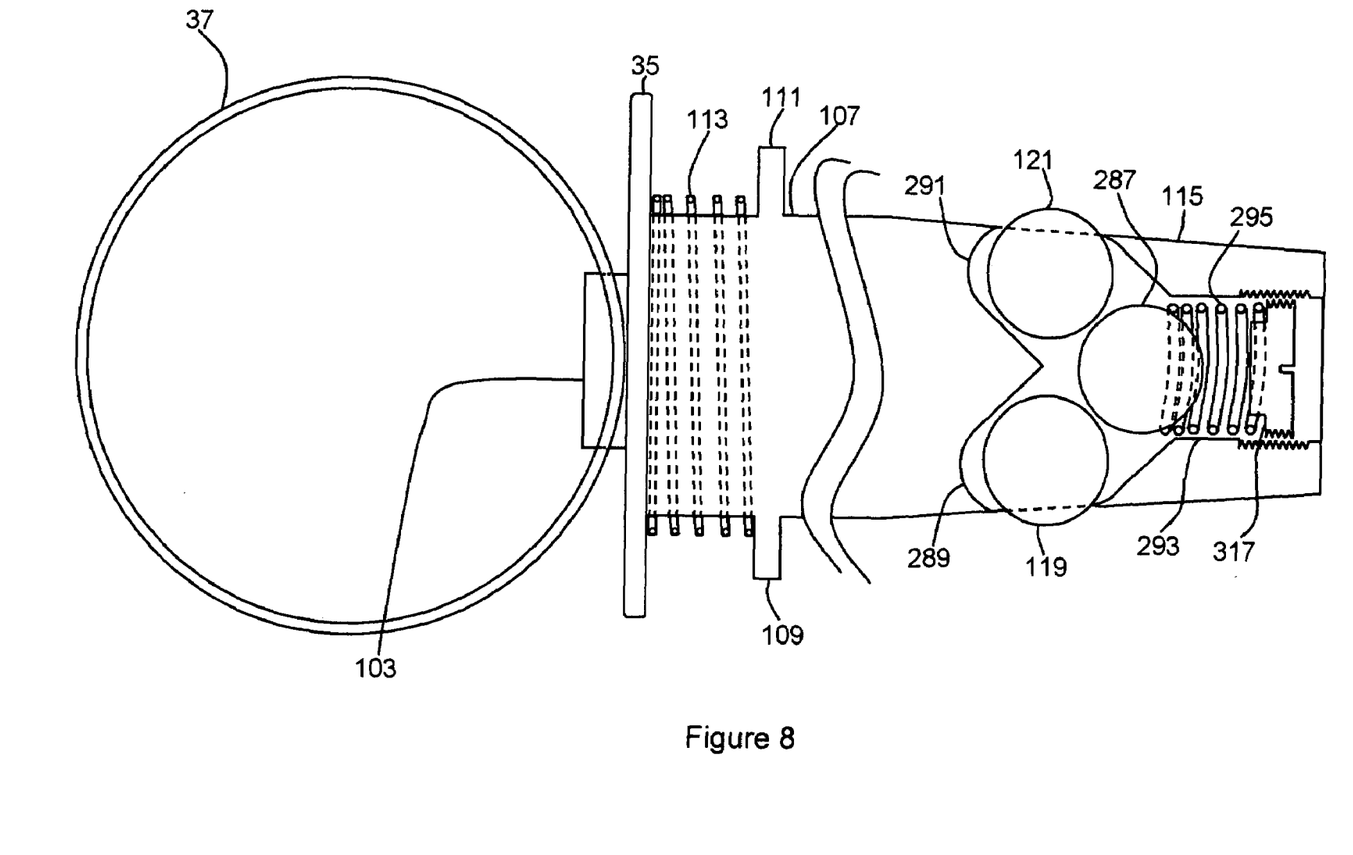
FIG. 8 is an expanded section view of the permanently lubricated adjustable tension lockable pin, also referred to as the lockable key.

FIG. 8 is an expanded section view of the permanently lubricated adjustable tension lockable pin, also referred to as the lockable key, in accordance with the second embodiment of the present invention. In the lower portion, the tapered portion 115 has apertures 289 and 291 through which the two opposing depressible balls 119 and 121 protrude and depend, as indicated above with respect to FIG. 5. The depressible balls 119 and 121 are forced outwardly from the tapered portion 115 of the shaft 107 by at least one spring internal to the shaft 107.

When external pressure is applied, the depressible balls 119 and 121 may be forced against the wedge member, the wedge member being a third depressible ball, against the spring 295 into the body of the tapered portion 115 of the shaft 107 past the cylindrical form defining the outer diameter of the shaft 107. The spring 295 is a second spring that is mounted internal to the shaft and acts to push the depressible balls outwardly through the apertures. When no external pressure is applied, the depressible balls 119 and 121 are free to depend outwardly.

The lockable key 105 of FIG. 8, like the lockable key 105 of FIG. 5, also includes an upper portion that is seen to provide a shaft 107, connected to the bottom of the flange 35, and opposing left and right hand lateral appendages 109 and 111, respectively. Once the lockable key 105 is fully inserted into a keyed aperture having both a key way and a locking area, a twisting motion will force the movement of the lateral appendages 109 and 111 into the locking area within the keyed aperture. The locking area permits lateral movement of the lateral appendages 109 and 111, and thus of the lockable key 105, but not vertical movement, thereby acting as a lock retaining the lockable key 105 within the slideable shaft.

The lockable key also includes a first spring, identified as a coiled spring 113, that is coiled around the shaft between the lateral appendages 109 and 111 and the flange 35. The expanded sectional view of the permanently lubricated adjustable tension lockable pin of FIG. 8 provides a more detailed view of these feature than the sectional view of the permanently lubricated adjustable tension lockable pin of FIG. 5, but in both, the flange 35 separates the shaft 107 of the lockable key 105 from the head region of the lockable key 105, and further serves to restrain the coiled spring 113. As it compresses, the coiled spring 113 provides resistance to insertion of the lockable key 105 into the keyed aperture of a slideable shaft.

Like the lockable key of FIG. 5, the lockable key of FIG. 8 also includes a head region having a Swivelable connector 103 that connects a handle 37 to an upper surface of a flange 35. The ring shaped handle 37 permits easy insertion of a finger to retract the lockable key 105 from a keyed aperture into which it may have been inserted, and the Swivelable connector 103 permits the handle 37 to lie flat against the flange 35 when not in use. The lockable key 105 may be grasped by the handle 37, aligned with the key way of a keyed aperture, and pushed longitudinally down into the keyed aperture, causing a depression of the depressible balls 119 and 121 to fit within the circumference of the keyed aperture.

FIG. 8 also provides a more detailed view of a relationship between the tapered region 115 (shown generally in FIG. 5) and the permanently lubricated adjustable tension insert 317 (shown generally in FIGS. 6 and 7). As indicated with respect to FIGS. 5–7 and with respect to FIG. 8, the permanently lubricated adjustable tension insert 317 is a short cylinder having (a) a slotted circular base operative to allow a screwdriver to be used to adjust the permanently lubricated adjustable tension insert 317 and (b) a threaded lateral surface allowing the permanently lubricated adjustable tension insert 317 to be unscrewed from the tapered region when lubricant is to be applied. The permanently lubricated adjustable tension insert 317 lacks the small hole to allow air to penetrate into the shaft and for the application of a lubricant.

Figure 9:
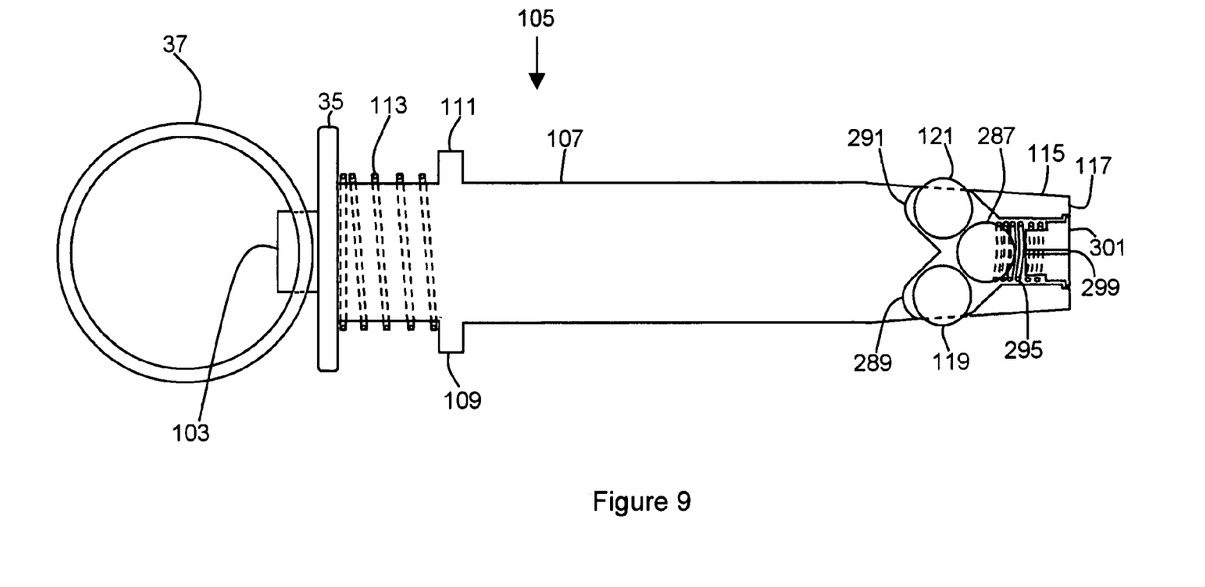
FIG. 9 is a section view of a manually lubricated high/medium/low tension lockable pin, also referred to as a lockable key.
Figure 14:
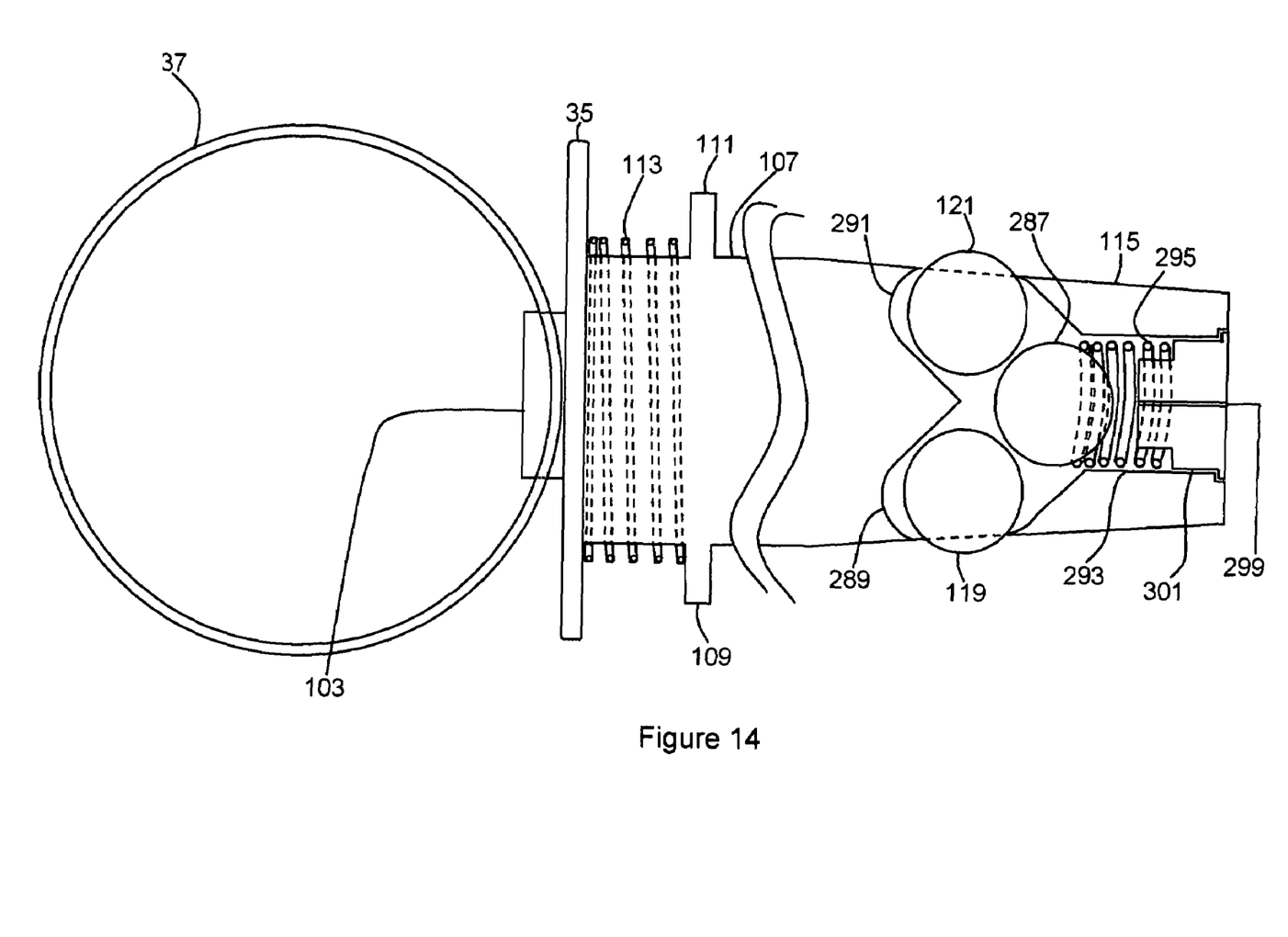
FIG. 14 is an expanded sectional view of a manually lubricated high/medium/low tension lockable pin, also referred to as a lockable key.

FIG. 9 is a section view of a manually lubricated high/medium/low tension lockable pin, also referred to as a lockable key, in accordance with a third embodiment of the present invention. FIG. 14 is an expanded sectional view of a manually lubricated high/medium/low tension lockable pin, also referred to as a lockable key, in accordance with the third embodiment of the present invention. Referring now to both FIG. 9 and FIG. 14, it can be seen that a manually lubricated low tension insert 301 of FIG. 9 and FIG. 14 has a greater height than the manually lubricated adjustable tension insert 297 (of FIGS. 1–4) or the permanently lubricated adjustable tension insert 317 (of FIGS. 5–8). The greater height allows for a longer internal spring and for a greater range of motion for the wedge member and consequently for the two opposing depressible balls 119 and 121. The spring 295 may be replaced with a spring of greater or lesser spring constant, where the "spring constant" refers to a longitudinal force per length of compression. If a spring of lesser spring constant is used, the two opposing depressible balls 119 and 121 apply less frictional resistance to a withdrawal of the lockable key than if a spring of greater spring constant is used.

In the lower portion of the permanently lubricated adjustable tension lockable pin, also referred to as the lockable key, of FIGS. 9 and 14, the tapered portion 115 has apertures 289 and 291 through which the two opposing depressible balls 119 and 121 protrude and depend, as indicated above with respect to FIGS. 1, 4, 5, and 8. The depressible balls 119 and 121 are forced outwardly from the tapered portion 115 of the shaft 107 by at least one spring internal to the shaft 107.

When external pressure is applied, the depressible balls 119 and 121 may be forced against the wedge member, the wedge member being a third depressible ball, against the spring 295 into the body of the tapered portion 115 of the shaft 107 past the cylindrical form defining the outer diameter of the shaft 107. The spring 295 is a second spring that is mounted internal to the shaft and acts to push the depressible balls outwardly through the apertures. When no external pressure is applied, the depressible balls 119 and 121 are free to depend outwardly. However, due to the spring 295 having an adjustable spring constant or being subject to being replaced by a spring of greater or lesser spring constant, the lockable key, of FIGS. 9 and 14 provides a quantity of frictional resistance, inhibiting withdrawal of the lockable key. The quantity of frictional resistance is appropriate to the purpose for which the lockable key is used.

The lockable key 105 of FIGS. 9 and 14, like the lockable key 105 of FIGS. 1, 4, 5, and 8, also includes an upper portion that is seen to provide a shaft 107, connected to the bottom of the flange 35, and opposing left and right hand lateral appendages 109 and 111, respectively. Once the lockable key 105 is fully inserted into a keyed aperture having both a key way and a locking area, a twisting motion will force the movement of the lateral appendages 109 and 111 into the locking area within the keyed aperture. The locking area permits lateral movement of the lateral appendages 109 and 111, and thus of the lockable key 105, but not vertical movement, thereby acting as a lock retaining the lockable key 105 within the slideable shaft.

The lockable key also includes a first spring, identified as a coiled spring 113, that is coiled around the shaft between the lateral appendages 109 and 111 and the flange 35. The expanded sectional view of the manually lubricated high/medium/low tension lockable pin, also referred to as a lockable key of FIG. 14 provides a more detailed view of these features than the sectional view of the manually lubricated high/medium/low tension lockable pin, also referred to as a lockable key of FIG. 9, but in both, the flange 35 separates the shaft 107 of the lockable key 105 from the head region of the lockable key 105, and further serves to restrain the coiled spring 113. As it compresses, the coiled spring 113 provides resistance to insertion of the lockable key 105 into the keyed aperture of a slideable shaft.

Like the lockable key of FIGS. 1, 4, 5, and 8, the lockable key of FIGS. 9 and 14 also includes a head region having a Swivelable connector 103 that connects a handle 37 to an upper surface of a flange 35. The ring shaped handle 37 permits easy insertion of a finger to retract the lockable key 105 from a keyed aperture into which it may have been inserted, and the Swivelable connector 103 permits the handle 37 to lie flat against the flange 35 when not in use. The lockable key 105 may be grasped by the handle 37, aligned with the key way of a keyed aperture, and pushed longitudinally down into the keyed aperture, causing a depression of the depressible balls 119 and 121 to fit within the circumference of the keyed aperture.

Figure 10:
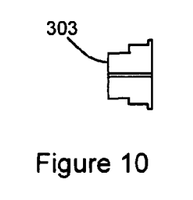
FIG. 10 is a side view of a manually lubricated medium-tension insert.
Figure 11:
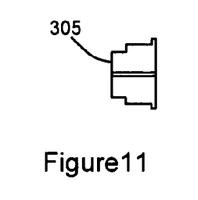
FIG. 11 is a side view of a manually lubricated medium-tension insert.
Figure 12:
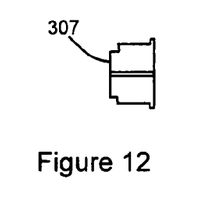
FIG. 12 is a side view of a manually lubricated high-tension insert.

FIG. 14 also provides a more detailed view of a relationship between the tapered region 115 (shown generally in FIG. 9) and (a) the manually lubricated adjustable high/medium/low tension insert 301 (shown generally in FIG. 9), (b) the manually lubricated adjustable low tension insert 303 (shown generally in FIG. 10), (c) the manually lubricated adjustable medium tension insert 305 (shown generally in FIG. 11), and (d) the manually lubricated adjustable high tension insert 307 (shown generally in FIG. 12).

Figure 13:
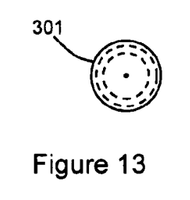
FIG. 13 is a top view of a manually lubricated adjustable high/medium/low tension insert.

A cross section of the manually lubricated adjustable high/medium/low tension insert 301 (shown generally in FIG. 9) is presented in FIG. 13. Although not specifically shown, the manually lubricated adjustable low tension insert 303 (shown generally in FIG. 10), the manually lubricated adjustable medium tension insert 305 (shown generally in FIG. 11), and the manually lubricated adjustable high tension insert 307 (shown generally in FIG. 12) each have a cross section that is identical to that of the manually lubricated adjustable high/medium/low tension insert 301 presented in FIG. 13.

Although FIGS. 9–13 do not specifically show threading or slotting, the manually lubricated adjustable high/medium/low tension insert 301 (shown generally in FIG. 9), the manually lubricated adjustable low tension insert 303 (shown generally in FIG. 10), the manually lubricated adjustable medium tension insert 305 (shown generally in FIG. 11), and the manually lubricated adjustable high tension insert 307 (shown generally in FIG. 12) all may have (a) a slotted circular base operative to allow a screwdriver to be used to adjust it and (b) a threaded lateral surface allowing it to be unscrewed from the tapered region when lubricant is to be applied. A small hole 299 allows air to penetrate into the shaft and for the application of a lubricant.

Figure 15:
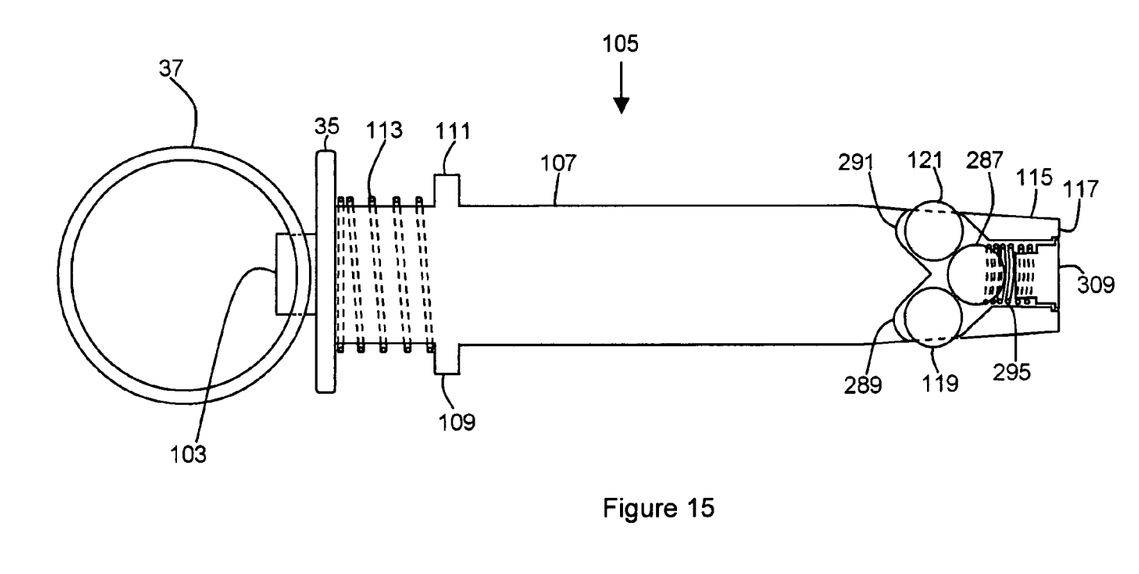
FIG. 15 is a section view of a permanently lubricated high/medium/low tension lockable pin, also referred to as a lockable key.
Figure 20:
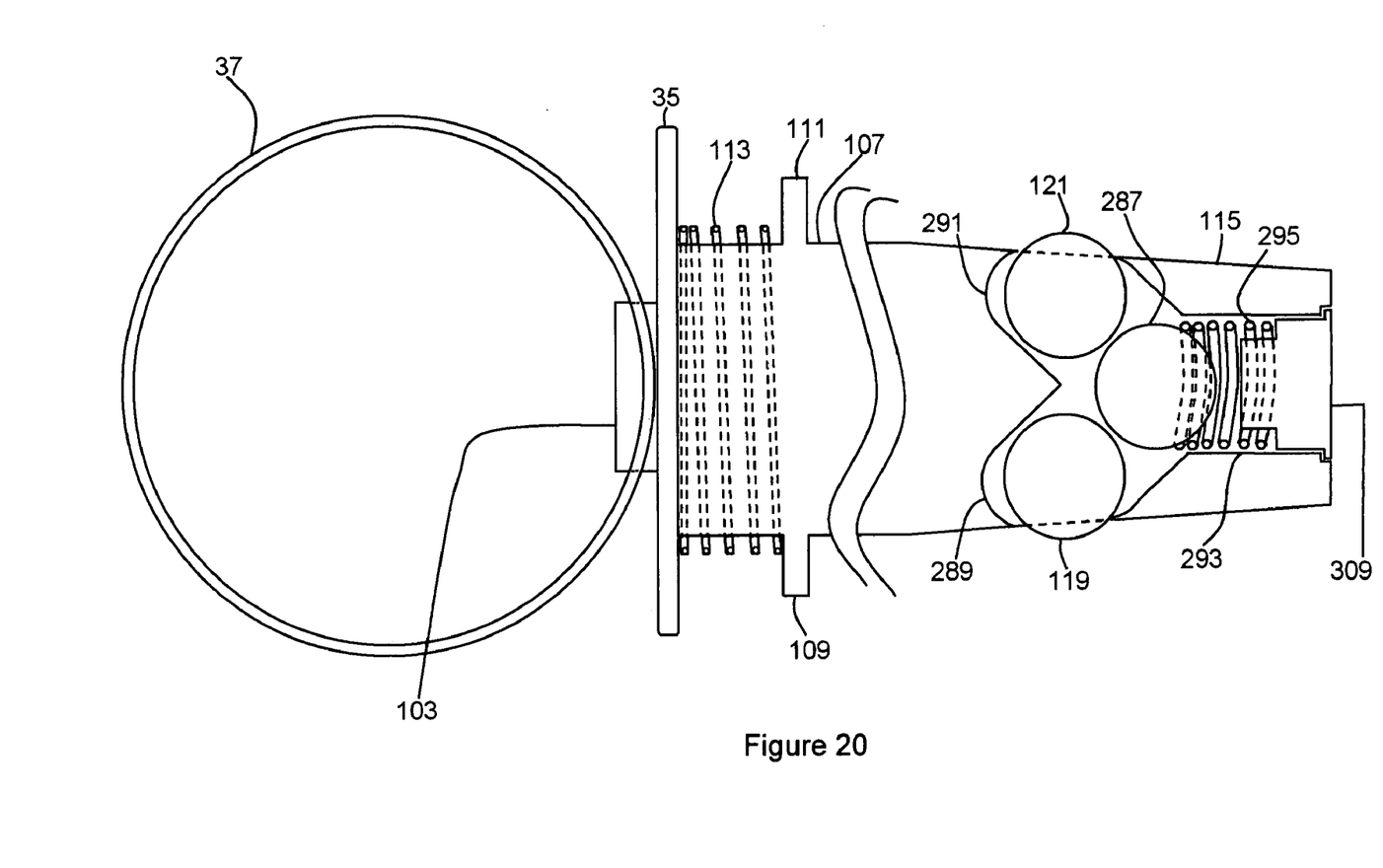
FIG. 20 is an expanded section view of a permanently lubricated high/medium/low tension lockable pin, also referred to as a lockable key.

FIG. 15 is a sectional view of a permanently lubricated high/medium/low tension lockable pin, in accordance with a fourth embodiment of the present invention. FIG. 20 is an expanded sectional view of a permanently lubricated high/medium/low tension lockable pin, also referred to as a lockable key, in accordance with the fourth embodiment of the present invention. Referring now to both FIG. 15 and FIG. 20, it can be seen that a permanently lubricated low tension insert 301 of FIG. 15 and FIG. 20 has a greater height than the permanently lubricated adjustable tension insert 317 (of FIGS. 5–8). The greater height allows for a longer internal spring and for a greater range of motion for the wedge member and consequently for the two opposing depressible balls 119 and 121. The spring 295 may be replaced with a spring of greater or lesser spring constant, where the "spring constant" refers to a longitudinal force per length of compression. If a spring of lesser spring constant is used, the two opposing depressible balls 119 and 121 apply less frictional resistance to a withdrawal of the lockable key than if a spring of greater spring constant is used.

In the lower portion of the permanently lubricated adjustable tension lockable pin, also referred to as the lockable key, of FIGS. 15 and 20, the tapered portion 115 has apertures 289 and 291 through which the two opposing depressible balls 119 and 121 protrude and depend, as indicated above with respect to FIGS. 1, 4, 5, 8, 9, and 14. The depressible balls 119 and 121 are forced outwardly from the tapered portion 115 of the shaft 107 by at least one spring internal to the shaft 107.

When external pressure is applied, the depressible balls 119 and 121 may be forced against the wedge member, the wedge member being a third depressible ball, against the spring 295 into the body of the tapered portion 115 of the shaft 107 past the cylindrical form defining the outer diameter of the shaft 107. The spring 295 is a second spring that is mounted internal to the shaft and acts to push the depressible balls outwardly through the apertures. When no external pressure is applied, the depressible balls 119 and 121 are free to depend outwardly. However, due to the spring 295 having an adjustable spring constant or being subject to being replaced by a spring of greater or lesser spring constant, the lockable key, of FIGS. 15 and 20 provides a quantity of frictional resistance to withdrawal that is appropriate to the purpose for which the lockable key is used.

The lockable key 105 of FIGS. 15 and 20, like the lockable key 105 of FIGS. 1, 4, 5, 8, 9, and 14, also includes an upper portion that is seen to provide a shaft 107, connected to the bottom of the flange 35, and opposing left and right hand lateral appendages 109 and 111, respectively. Once the lockable key 105 is fully inserted into a keyed aperture having both a key way and a locking area, a twisting motion will force the movement of the lateral appendages 109 and 111 into the locking area within the keyed aperture. The locking area permits lateral movement of the lateral appendages 109 and 111, and thus of the lockable key 105, but not vertical movement, thereby acting as a lock retaining the lockable key 105 within the slideable shaft.

The lockable key also includes a first spring, identified as a coiled spring 113, that is coiled around the shaft between the lateral appendages 109 and 111 and the flange 35. The expanded sectional view of the permanently lubricated high/medium/low tension lockable pin, also referred to as a lockable key of FIG. 20 provides a more detailed view of these features than the sectional view of the permanently lubricated high/medium/low tension lockable pin, also referred to as a lockable key of FIG. 15, but in both, the flange 35 separates the shaft 107 of the lockable key 105 from the head region of the lockable key 105, and further serves to restrain the coiled spring 113. As it compresses, the coiled spring 113 provides resistance to insertion of the lockable key 105 into the keyed aperture of a slideable shaft.

Like the lockable key of FIGS. 1, 4, 5, 8, 9, and 14, the lockable key of FIGS. 15 and 20 also includes a head region having a Swivelable connector 103 that connects a handle 37 to an upper surface of a flange 35. The ring shaped handle 37 permits easy insertion of a finger to retract the lockable key 105 from a keyed aperture into which it may have been inserted, and the Swivelable connector 103 permits the handle 37 to lie flat against the flange 35 when not in use. The lockable key 105 may be grasped by the handle 37, aligned with the key way of a keyed aperture, and pushed longitudinally down into the keyed aperture, causing a depression of the depressible balls 119 and 121 to fit within the circumference of the keyed aperture.

Figure 16:
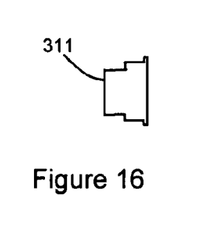
FIG. 16 is a side view of a permanently lubricated low-tension insert.
Figure 17:
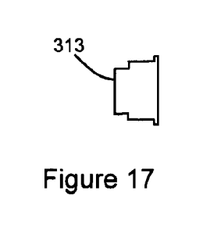
FIG. 17 is a side view of a permanently lubricated adjustable high/medium/low tension insert.
Figure 18:
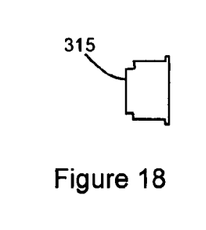
FIG. 18 is a side view of a permanently lubricated high-tension insert.

FIG. 20 also provides a more detailed view of a relationship between the tapered region 115 (shown generally in FIG. 15) and (a) the permanently lubricated adjustable high/medium/low tension insert 309 (shown generally in FIG. 15), (b) the permanently lubricated adjustable low tension insert 311 (shown generally in FIG. 16), (c) the permanently lubricated adjustable medium tension insert 313 (shown generally in FIG. 17), and (d) the permanently lubricated adjustable high tension insert 318 (shown generally in FIG. 18).

Figure 19:
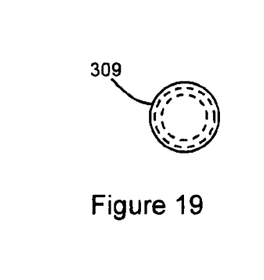
FIG. 19 is a top view of a permanently lubricated high/medium/low insert.

A cross section of the permanently lubricated adjustable high/medium/low tension insert 309 (shown generally in FIG. 15) is presented in FIG. 19. Although not specifically shown) the permanently lubricated adjustable low tension insert 311 (shown generally in FIG. 16), the permanently lubricated adjustable medium tension insert 313 (shown generally in FIG. 17), and the permanently lubricated adjustable high tension insert 315 (shown generally in FIG. 18) each have a cross section that is identical to that of the permanently lubricated adjustable high/medium/low tension insert 309 presented in FIG. 19.

Although FIGS. 15–19 do not specifically show threading or slotting, the permanently lubricated adjustable high/medium/low tension insert 309 (shown generally in FIG. 15), the permanently lubricated adjustable low tension insert 311 (shown generally in FIG. 16), the permanently lubricated adjustable medium tension insert 313 (shown generally in FIG. 17), and the permanently lubricated adjustable high tension insert 315 (shown generally in FIG. 18) all may have (a) a slotted circular base operative to allow a screwdriver to be used to adjust it and (b) a threaded lateral surface allowing it to be unscrewed from the tapered region when lubricant is to be applied. A small hole 299 allows air to penetrate into the shaft and for the application of a lubricant.

Figure 21:
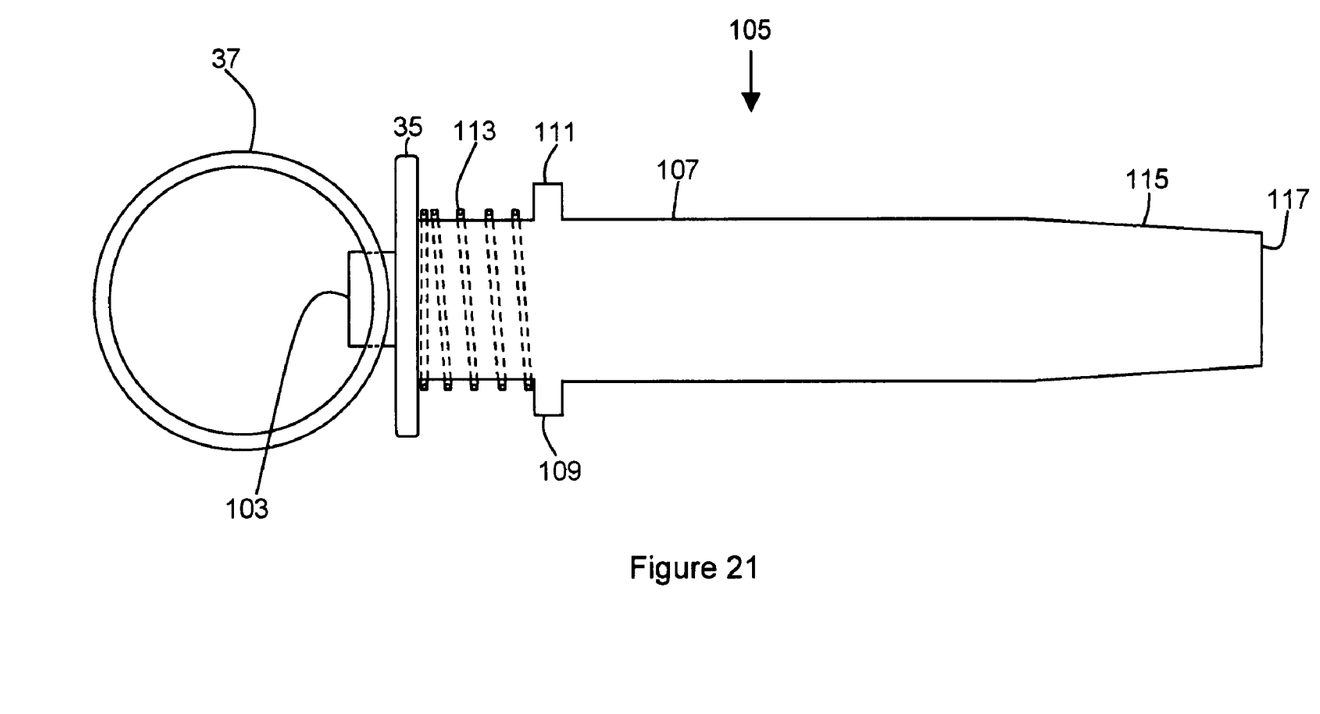
FIG. 21 is a sectional view of a lockable pin without depressible ball assembly, also referred to as a lockable key.

FIG. 21 is a sectional view of a lockable pin without depressible ball assembly, also referred to as a lockable key, in accordance with a fifth embodiment of the present invention. In a lower portion, the lockable key provides a tapered portion 115, which may be seen as a part of a shaft 107.

The lockable key 105 also includes an upper portion of the lockable key 105 that is seen to provide the shaft 107, connected to the bottom of the flange 35, and opposing left and right hand lateral appendages 109 and 111, respectively. The lockable key is thus suitable for insertion into a keyed aperture, for example a keyed aperture that has its interior shaft defined by a cylindrical form just slightly greater in diameter than the cylindrical form defining the outer diameter of the shaft 107.

Such a keyed aperture may be found, for example, in a slideable shaft. Because the lockable key has the opposing left and right hand lateral appendages 109 and 111, respectively, the keyed aperture may be constructed having a key way such that the lockable key 105 can only be slid into the keyed aperture when the opposing left and right hand lateral appendages 109 and 111, respectively, are aligned with the key way.

If the shaft 107 is regarded as having a cylindrical axis, a keyed aperture may be provided with a key way such that the lockable key 105 may be slid into the keyed aperture when the the lockable key 105 is in a first orientation with respect to the cylindrical axis, and such that the lockable key 105 may not be slid into the keyed aperture when the lockable key 105 has been rotated about, or is otherwise not in the first position with respect to, the cylindrical axis. The lateral appendages 109 and 111 of the lockable key 105 may therefore be aligned to coincide with the key way provided by the keyed aperture when the lockable key 105 is to be inserted into the keyed aperture. When the lockable key 105 has been inserted into such a keyed aperture, the two opposing depressible balls 119 and 121 provide resistance to retraction from the keyed aperture.

Once the lockable key 105 is fully inserted a twisting motion will force the movement of the lateral appendages 109 and 111 into a locking area within the shaft of a keyed aperture in a slideable shaft. The locking area permits lateral movement of the lateral appendages 109 and 111, and thus of the lockable pin 105, but not vertical movement, thereby acting as a lock retaining the lockable key 105 within the slideable shaft.

The lockable key also includes a first spring, identified as a coiled spring 113, that is coiled around the shaft between the lateral appendages 109 and 111 and the flange 35. The flange 35 separates the shaft 107 of the lockable key 105 from the head region of the lockable key 105, and further serves to restrain the coiled spring 113. As it compresses, the coiled spring 113 provides resistance to insertion of the lockable key 105 into the keyed aperture of a slideable shaft.

The lockable key also includes a head region having a Swivelable connector 103 that connects a handle 37 to an upper surface of a flange 35. The ring shaped handle 37 permits easy insertion of a finger to retract the lockable key 105 from a keyed aperture into which it may have been inserted, and the Swivelable connector 103 permits the handle 37 to lie flat against the flange 35 when not in use. The lockable key 105 may be grasped by the handle 37, aligned with the key way of a keyed aperture, and pushed longitudinally down into the keyed aperture, causing a depression of the two opposing depressible balls 119 and 121 to fit within the circumference of the keyed aperture.

As the lockable key 105 is pushed deeper into the keyed aperture, a widened region within the keyed aperture may allow the lockable key 105 to be rotated about the cylindrical axis of the shaft 107 (by turning the handle 37 about the cylindrical axis of the shaft 107) such that the lateral appendages 109 and 111 lock or set within the keyed aperture of the slideable shaft under an upper sheet of an upper surface through which the keyed aperture is provided. Regardless of whether the lockable key is turned, however, resistance caused by the depression of the depressible balls advantageously hinders removal of the lockable key from the keyed aperture. Retraction of a lockable pin is accomplished by turning the lockable pin to place the lockable pin's lateral appendages into the key way of the shaft within which the lockable pin is seated, then pulling the lockable pin's handle up, overcoming the resistance provided by the lockable pin's depressible balls, into the lockable pin is free.

While the preferred embodiments of the instant invention have been described in substantial detail and fully and completely hereinabove, it will be apparent to one skilled in the art that numerous variations of the instant invention may be made without departing from the spirit and scope of the instant invention, and accordingly the instant invention is to be limited only by the following claims.

I claim:

1. A lockable key comprising
   a handle,
   a flange,
   a shaft,
   a first spring,
   a second spring, and
   two depressible balls,
   wherein
   said handle is connected to the top of said flange,
   said shaft is connected to the bottom of said flange,
   said shaft provides two lateral appendages,
   said first spring is coiled around said shaft between said flange and said two lateral appendages,
   said shaft terminates in a tapered region,
   said tapered region provides apertures through which said depressible balls depend,
   and said second spring is mounted internal to said shaft and acts to push said depressible balls outwardly through said apertures.

2. The lockable key of claim 1 further comprising a wedge member operative to push said depressible balls outwardly through said apertures.

3. The lockable key of claim 2 wherein the wedge member is a third depressible ball.

4. The lockable key of claim 1 wherein the tapered region has a flat end.

5. The lockable key of claim 4 wherein the flat end is removable for an application of a lubricant.

6. The lockable key of claim 5 wherein the flat end provides a slot operative to allow a screwdriver to be used to adjust the flat end.

7. The lockable key of claim 4 wherein the flat end provides a hole for the application of a lubricant.

* * * * *